J. H. WEBSTER.
MANUFACTURE OF SALT.
APPLICATION FILED OCT. 18, 1912.
1,052,703.
Patented Feb. 11, 1913.
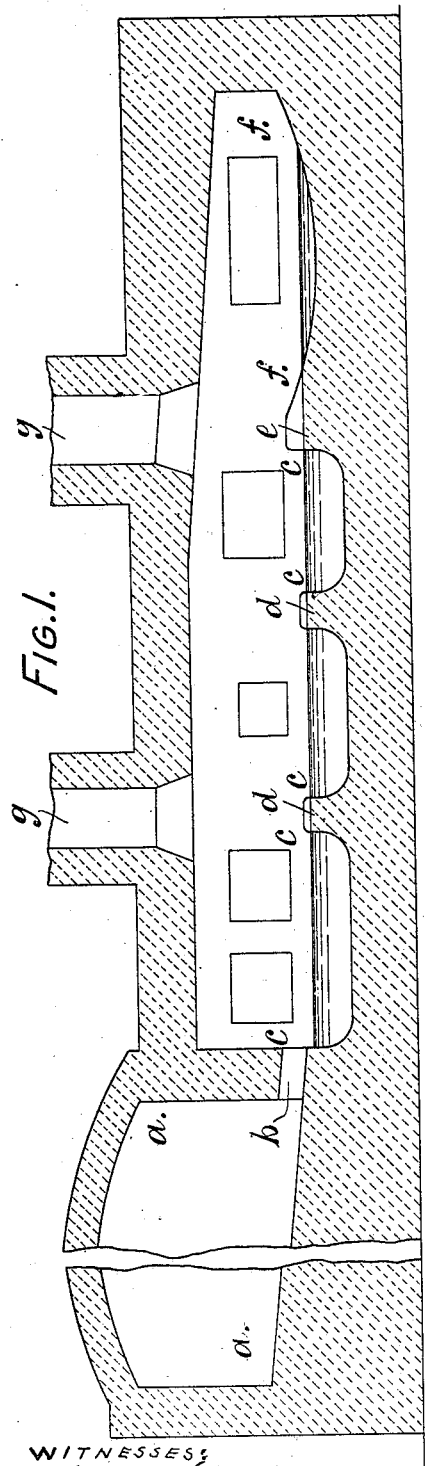
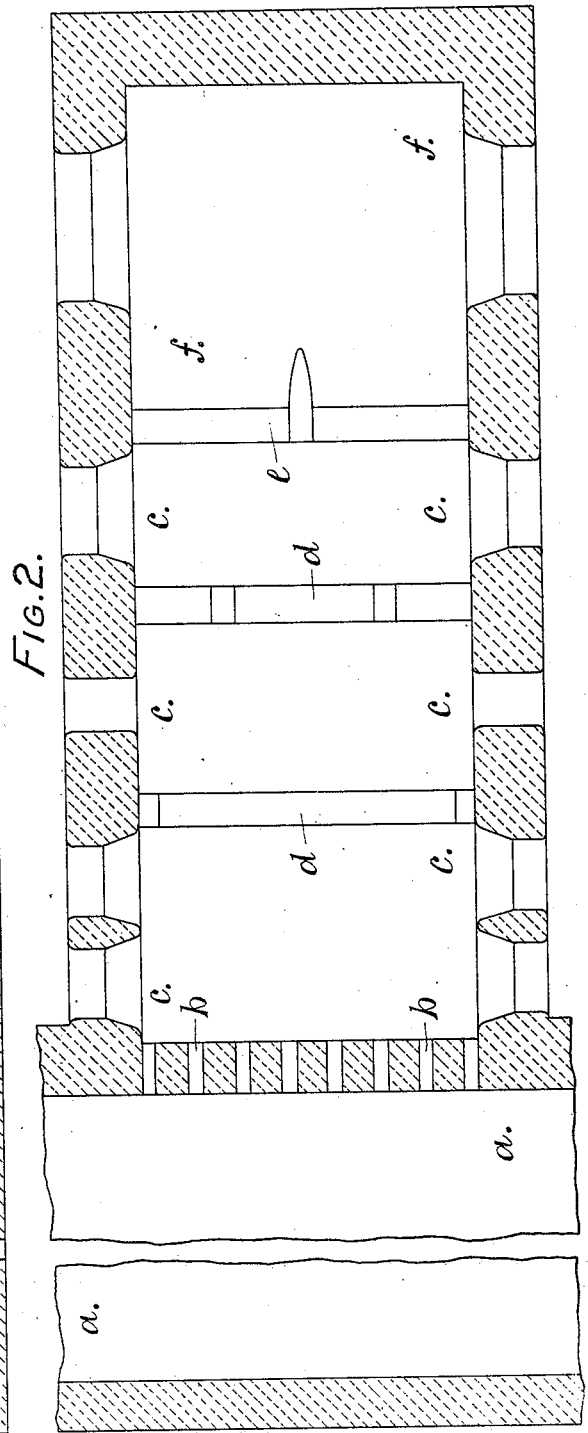

UNITED STATES PATENT OFFICE.

JOHN HERBERT WEBSTER, OF CARRICKFERGUS, IRELAND.

MANUFACTURE OF SALT.

1,052,703.  Specification of Letters Patent.   Patented Feb. 11, 1913.

Application filed October 18, 1912. Serial No. 726,478.

*To all whom it may concern:*

Be it known that I, JOHN HERBERT WEBSTER, a subject of the King of England, residing at Carrickfergus, county Antrim, Ireland, United Kingdom of Great Britain and Ireland, have invented new and useful Improvements in or Connected with the Manufacture of Salt, of which the following is a specification.
This invention has reference to the manufacture of salt (chlorid of sodium), and more particularly to that process of manufacture wherein the salt is melted by heat, and subsequently formed into grains, the salt used for manufacturing into pure and white salt being impure rock salt, or other salt which is not white or is discolored or any other salt which can be advantageously treated by the process.
The chief object of the present invention is to produce granulated salt directly from fused or melted salt, that is, without first having to allow it to solidify into blocks, and subsequently to break and crush these blocks into grains of the sizes required.

According to the invention the salt is melted, and while in its molten state it is agitated, or moved, or broken up, by means of any suitable kind, operated by hand, or by mechanical means, while in a body, and cooling and solidifying in said body, and is thereby converted directly into a granular condition. The grains of salt thus produced, in most cases, vary in size; and the different sizes of grains or crystals are separated according to requirements, by screening.

One form of furnace in which the manufacture of salt hereunder can be carried out is given in the accompanying drawing, in which—

Figure 1 is a longitudinal section, and Fig. 2 a plan.

The salt is melted in a furnace chamber *a;* and from this melting chamber, the molten salt passes by ports *b* into and through the baths *c* separated by division walls or bridges *d*, in which it is purified in any known way, and the impurities deposited and removed; and from the last of these chambers *c*, the salt flows by a gap or gaps in the bridge *e* into the chamber or bath *f* in which the salt is finished or granulated by being moved about or agitated by rakes or other instruments, the temperature of this chamber *f* being below the melting point of the salt; and by moving or stirring the salt about more or less continually on the floor of this chamber, it is directly formed into grains or crystals. This chamber *f*, if desired, can be separated from the other portion of the furnace chambers in which the baths *c* are, by a perforated wall or partition across it, so that the heat within these other chambers (from which the heating gases are carried off by the outlets *g*) is prevented from acting directly on the salt in the chamber *f*.

With regard to the heating of the furnace *a*, and the chambers or spaces *c*, these will be heated by combustible gases of a suitable kind to the required temperature to melt the salt in the manner of an ordinary reverberatory furnace; and to subsequently retain it in a molten condition.

With regard to the means of moving or stirring the molten body of salt about in the chamber *f* by mechanical means working in the liquid salt, or on it, this may be effected by hand rakes or like instruments passed through suitable doorways in the sides or other part of the chamber; but no matter what means may be used, the fact of moving it about more or less continually in a body, while gradually cooling and solidifying, causes it to be converted directly into a granular condition, in contradistinction to solidifying into large lumps or blocks; or being violently treated by means of an air or steam blast or mechanical heaters; and most (if not all) of the grains so produced of different sizes are the finished sizes required in commerce; and they can be graded or separated directly by sieving or screening into their various sizes.

When mechanically operated means is used for converting the molten salt into the granular condition it can be of any kind by which the molten salt is moved about in such a way as to break it up; that is, so as to prevent it forming or setting into lump or block form; and this, as stated, is done by more or less continually acting on the salt from the time it enters the finishing chamber, apparatus or vessel, to the time the grains of salt appear and separate.

What I claim is:—

The herein described process of manufacturing salt in granular form from molten salt, consisting in moving about or stirring the molten salt in a body while cooling until grains appear and separate, substantially as described.

In testimony whereof I have signed my name to this specification in the presence of two subscribing witnesses.

JOHN HERBERT WEBSTER.

Witnesses:
DAVID HODKINSON,
THOMAS M. DAWSON.